3,329,489
POLYBENZIMIDAZOLE RESIN BONDED ABRASIVE ARTICLES

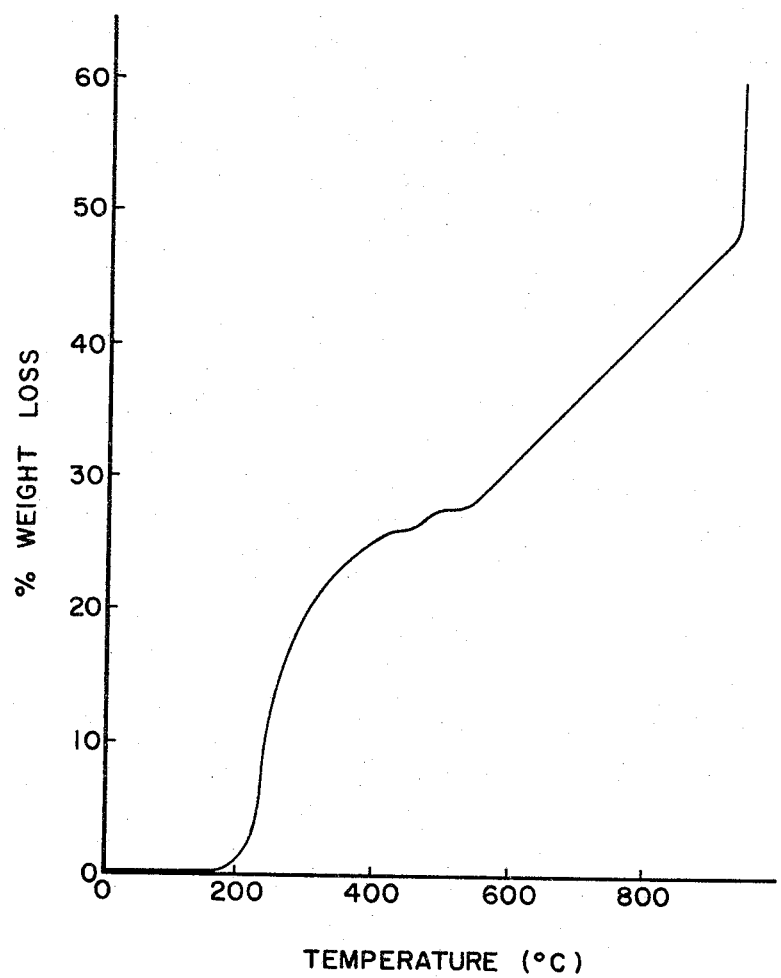

John H. Mason, Clarence, and Harold A. Stein, Niagara Falls, N.Y., assignors to The Carborundum Company, Niagara Falls, N.Y., a corporation of Delaware
Filed Nov. 8, 1965, Ser. No. 506,746
10 Claims. (Cl. 51—298)

This invention relates to improved bonded abrasive articles and to a method for producing them. More particularly this invention relates to abrasive articles bonded by a polybenzimidazole resin and to a method for making such articles.

Many organic polymers have been advantageously used as bonding agents for abrasive articles. These include such widely diverse materials as rubber, both natural and synthetic, phenol-formaldehyde resins, urea-formaldehyde resins, aniline-formaldehyde resins, melamine-formaldehyde resins, polyamides, polyesters, epoxy resins, and shellac. These materials have properties that suit them as bonds for specific grinding applications. For example, in certain applications it is desirable to have a soft, tough bond such as is provided by rubber. Rubber, however, is not resistant to high temperatures and thus the bonded abrasive article cannot be subjected to applications where high temperatures are to be encountered. In other instances it is desirable to have soft brittle bonds such as would be provided by the use of shellac as the bonding material. However, there is an increasing need for resin bonded abrasives capable of withstanding high grinding speeds and pressures. This coupled with the advent of tougher abrasives, which do not readily dull, has led to the need for tougher, more thermally resistant bonds which will retain the abrasive grains for as long a period as possible under severe grinding conditions.

Considerable effort has been spent in recent years on the development of tough, thermally resistant, bonding materials. Although many materials have been suggested, many of them have been deficient in toughness, and none have been perfectly satisfactory.

Accordingly it is an object of this invention to provide improved bonded abrasive articles.

It is a further object to provide improved bonded abrasive articles having a tough, thermally resistant bond.

Another object is to incorporate, as a bonding material in bonded abrasive articles, a tough, termally resistant ploymer which can be used with any abrasive material and which may be used as a bonding material alone or in conjunction with any filler material.

Another object is to provide a method for producing improved bonded abrasive articles which have a tough, thermally resistant, polybenzimidazole bond.

Various other objects and advantages will appear from the following description of an embodiment of the invention, and the novel features will be particularly pointed out hereinafter in the description and the appended claims.

In accordance with the present invention bonded abrasive articles are improved by the use as bonding materials of polybenzimidazole resins. We have discovered that bonded abrasive articles, such as grinding wheels, which use polybenzimidazole resins as bonds exhibit greatly increased grinding efficiency, pariticularly under severe grinding conditions and/or where high temperatures are encountered. Grinding efficiency, as used herein, is the ratio of cubic inches of test material removed to the cubic inches of wheel loss. Cemented carbide was used as the test material in all of the grinding wheel evaluation tests set forth in this specification.

Examples of various monomers that will condense to form polybenzimidazole resins which are suitable for use in this invention, are shown in United States Patents 2,895,948 to Brinker et al. and 3,174,947 to Marvel et al. However, cured polybenzimidazole resins made according to these patents are normally not heat flowable and are insoluble in most solvents thus making them unuseable as bonding materials for bonded abrasive articles. On the other hand, the monomers or prepolymers of polybenzimidazole resins contain a high content of volatile material and their use as moldable bonding materials is impractical since the evolution of the volatile materials (primarily phenol and water) during curing, cause voids and pores in the finished article and are harmful to the molding equipment and operating personnel.

We have found that, for reasons tentatively set out below, heat flowable polybenzimidazole resins having a low content of volatile material can be formed by heating the resin forming materials at a temperature of not more than 300° C. in an inert atmosphere.

Referring to the figure, which is a thermogravimetric analysis curve for a typical polybenzimidazole polymer, it can be seen that from 0° C. to about 400° C. there is a considerable evolution of volatile material. Between 400° C. and 550° C. there is an inflection in the curve which indicates that the rate of evolution of volatile material is at a minimum. Above 550° C. the polymer system begins to decompose and the rate of evolution of volatiles again becomes substantial. Therefore, by avoiding a temperature higher than about 300° C. in forming the polybenzimidazole resins for use in producing bonded abrasive articles the resin is readily heat flowable while at the same time the major portion of the volatile material has been evolved so that excessive porosity will be prevented.

Polybenzimidazole resins suitable for use in the bonded abrasive articles of this invention may be produced directly from the monomers, which can be polymerized to form the polybenzimidazole resins, or from prepolymers derived from these monomers. It is generally more convenient to use commercially available prepolymers. One such material is a polybenzimidazole prepolymer formed by the condensation reaction of 3,3'-diaminobenzidine and diphenyl isophthalate manufactured by the Narmco Division of the Whittaker Corporation, Costa Mesa, Calif., and sold under the trademark IMIDITE® 2801.

In forming abrasive articles according to this invention the prepolymer may be advanced to a more highly reacted state separately or in combination with filler material and/or abrasive granules. It is preferred to mix the filler and abrasive with the prepolymer prior to such advancement thereof since this appears to produce improved wetting of the abrasive and filler. This is borne out by the fact that grinding wheels produced by molding a prepolymer in which the filler and abrasive were mixed prior to advancement, exhibit higher impact strengths and greater flexural strength than do wheels produced using prepolymers which have been advanced separately from the abrasive and filler materials.

Polybenzimidazole resins may be used with any desired abrasive material, for example, diamond, silicon carbide, fused alumina, and mixtures of these with or without other abrasives, in the production of bonded abrasive articles. In forming such abrasive articles any desired filler material may be included in the mix. Although it is not intended to limit the use of fillers to those listed it will be clear that any of the widely used ones, such as calcium carbonate, cryolite, quartz, and fine grit sizes of silicon carbide, alumina and the like can be used.

The following example illustrates a method for advancing a polybenzimidazole resin for use in this invention.

Example 1

A prepolymer formed from the reaction of 3,3' diaminobenzidine with diphenyl isophthalate was gradually heated to a temperature of about 295° C. in an inert atmosphere and held at that temperature for about one hour. The resulting advanced resin was found to contain 6.6 percent by weight of volatile material and it was noted that the resin exhibited about a 25 percent weight loss during advancement.

The following example illustrates a variant method for preparing an advanced polybenzimidazole resin.

*Example 2*

A mixture was formed which consisted of the prepolymer of Exmaple 1 and silicon carbide granules. The silicon carbide was added in sufficient quantity to provide about 25 percent by volume silicon carbide in the mix based on the mixture after evolution of substantially all volatile material. The mixture was advanced as in Example 1 and the resulting advanced resin-silicon carbide product was crushed so as to pass through a 30 mesh screen.

The following example illustrates the production of bonded abrasive articles from polybenzimidazole resin and abrasive grain.

*Example 3*

Polybenzimidazole bonded abrasive wheels were produced by placing a mix of polybenzimidazole resin advanced as described above, and abrasive material in a mold and hot pressing the mix at temperatures ranging from above the temperature of resin advancement up to about 400° C. at pressures of from about 2000 p.s.i. to 10,000 p.s.i. Molding pressure may vary depending on the size of the article and the molding temperature. Abrasive wheels were produced from both resin advanced with silicon carbide, as in Example 2, and from a mix consisting of 75 volume percent of resin advanced as in Example 1, and 25 volume percent silicon carbide granules.

The abrasive wheels were then checked for density, flexural strength and modulus of elasticity in bending. Table I sets forth the results of these tests.

midazole resin as the bonding material, was produced in accordance with this invention. The non-abrasive supporting portion of said wheel consisted of an advanced polybenzimidazole resin-particulate silicon carbide filler mix which had been advanced in accordance with Example 2. The abrasive or grinding portion consisted of 75 volume percent polybenzimidaloze resin and 25 volume percent 100 grit diamond adrasive. The resin of the abrasive portion was advanced in the presence of the diamond abrasive using the procedure of Example 2. The wheel was formed by heating the material up to about 400° C. and the use of a pressure of about 10,000 p.s.i.

Other polybenzimidazole bonded diamond abrasive wheels were made in the same manner as set out above except that the abrasive portion of the wheel included 25 volume percent of 120 grit silicon carbide filler in addition to the diamond abrasive.

The wheels were evaluated by a standard test which consists of passing the rotating wheel along a cemented carbide block at the rate of 40 feet per minute. The depth of cut or infeed is preset and the advance of the wheel across the width of the block (cross feed) is maintained as a constant. One pass comprises running the wheel under test along the carbide block, advancing the wheel across the width of the block at the end of each run, until the entire surface of the block has been ground. The carbide block employed was 4″ x 5″ and was composed of ninety ⅜ x ⅝ carbide pieces. Wheels were tested with infeeds of 0.002 inch and 0.004 inch, respectively, and with coolant flows of 3.6 gals./min. and 0.8 gal./min., respectively. Some of the wheels were also tested dry. For purposes of comparison standard phenolic resin bonded diamond abrasive wheels of the same type were also tested under the same conditions. The test results shown in Tables II and III are reported as the ratio of the grinding efficiencies of abrasive wheels according to the present invention to the efficiencies of the standard phenolic wheels, with the latter being arbitrarily set at 100.

TABLE I.—PHYSICAL PROPERTIES OF POLYBENZIMIDAZOLE BONDED—SiC ARTICLES

| Processing Conditions | Density (gms./in.³) After Molding | Flexural Strength (p.s.i.) After Molding, ASTM D-790-63 | Modulus of Elasticity in Bending, ASTM D-790-63 |
|---|---|---|---|
| Resin advanced in the presence of SiC, molded 4,000 p.s.i. | 30.6 | 20,900 | 2.3×10⁶ |
| Resin advanced separately, SiC added before molding—molded at 4,000 p.s.i. | 30.7 | 14,600 | 2.3×10⁶ |
| Resin advanced in the presence of SiC, molded at 2,000 p.s.i. | 30.2 | 16,300 | 2.1×10⁶ |

As is shown in Table I abrasive articles molded from polybenzamidazole resin which has been advanced in the presence of the abrasive material, as in Example 2, have higher flexural strengths than when the resin is advanced as in Example 1 even when molded at a lower pressure. Accordingly it is preferred to advance the polybenzimidazole resin the presence of abrasive and/or filler material.

Bonded abrasive articles made according to this invention can be made in the same manner generally employed in the production of resinoid bonded abrasive articles, such as taught, for example, in U.S. Patents 2,067,517 to Robie and 2,249,278 to Kistler or in U.S. Patent 2,073,590 to Sanford.

The following example illustrates the use of polybenzimidazole resin as a bonding material in a bonded diamond abrasive wheel.

*Example 4*

A standard D1A1 type bonded abrasive wheel having a non-abrasive supporting portion and a diamond-containing abrasive portion affixed thereto; and having polybendi- TABLE II.—GRINDING EFFICIENCY OF POLYBENZIMIDAZOLE RESIN BONDED DIAMOND ABRASIVE WHEELS—MODERATE GRINDING CONDITIONS

| Wheel Tested | Grinding Efficiency | |
|---|---|---|
| | Test Conditions A [1] | Test Conditions B [2] |
| Diamond Abrasive—Polybenzimidazole Resin Bond (No Filler Material) | 160.6 | 139.2 |
| Standard Phenolic Resin—Diamond Abrasive | 100.0 | 100.0 |

[1] Test Conditions A:
- Infeed (in.) _____ 0.002
- Cross feed (in.) _____ 0.060
- Coolant flow (gal./min.) _____ 3.6
- Number of passes _____ 100

[2] Test Conditions B:
- Infeed (in.) _____ 0.000
- Cross feed (in.) _____ 0.062
- Coolant flow (gal./min.) _____ 0.8
- Number of passes _____ 100

TABLE III.—GRINDING EFFICIENCY OF POLYBENZIMIDAZOLE RESIN BONDED DIAMOND ABRASIVE WHEELS

| Wheel Tested | Grinding Efficiency | |
|---|---|---|
| | Test Conditions C [1] | Test Conditions D [2] |
| Diamond Abrasive—Polybenzimidazole Resin Bond 25 Volume Percent Particulate SiC Filler | 160.5 | 140.6 |
| Standard Phenolic Resin—Diamond Abrasive | 100.0 | 100.0 |

[1] Test Conditions C:
  Infeed (in.) _____ 0.004
  Cross feed (in.) _____ 0.060
  Coolant flow (gal./min.) _____ 3.6
  Number of passes _____ 15
[2] Test Conditions D:
  Infeed (in.) _____ 0.002
  Cross feed (in.) _____ 0.060
  Coolant flow (gal./min.) _____ none
  Number of passes _____ 10

As can be seen from the data of Tables II and III polybenzimidazole resin bonded wheels show a vast improvement over the standard phenolic resin bonded wheels even where the grinding conditions are severe, such as encountered when no coolant is used during the grinding operation.

*Example 5*

The effect on grinding performance of abrasive wheels of the degree of advancement of the polybenzimidazole prepolymer used therein was tested in the following manner. An advanced resin-silicon carbide mix was prepared as in Example 2 except that the maximum temperature employed was varied in order to affect the amount of remaining volatiles. The mixtures were heated, respectively, to temperatures of approximately 230° C., 260° C. and 290° C., respectively. The percentage of volatile matter in the resins after heating ranged from 9.5 percent for the resin heated to approximately 230° C. to 2.6 percent for the resin heated to approximately 290° C.

Wheels were made in the same manner as in Example 4 and tested in accordance with the testing procedure set forth in Example 4. The grinding efficiencies thereof are shown in Table IV.

TABLE IV.—EFFECT OF RESIN VOLATILES CONTENT ON GRINDING PERFORMANCE

Percent volatiles in resin:     Grinding efficiency [1]
9.5 _____ 36.8
4.2 _____ 44.4
2.6 _____ 42.6

[1] Grinding efficiency determined under the following test conditions:
  Infeed (in.) _____ 0.002
  Cross feed (in.) _____ 0.060
  Coolant flow (gal./min.) _____ 0.8
  Number of passes _____ 100

Due to the high strength and excellent bonding characteristics of polybenzimidazole resins, abrasive articles made according to this invention exhibit a much greater useful life than abrasive articles bonded with conventional resins. In addition, polybenzimidazole resin bonded abrasive articles are particularly suited for grinding applications where high temperatures are to be encountered or generated by severe operating conditions. Among such applications are snagging wheels for heavy duty grinding, wheels for use in hot grinding operations, and other applications where thermal stability of the resin bond is necessary.

If desired polybenzimidazole resin bonded abrasive articles made according to this invention may be subsequently heated to a temperature of about 400° C. and maintained at that temperature for a sufficient period to relieve internal stress and eliminate entrapped volatiles thereby improving the physical properties of the abrasive article. In addition it is within the scope of this invention to include suitable scavengers with the resin to absorb the volatile materials produced during the condensation reaction and thus improve bond density.

While the invention has been described in connection with specific embodiments thereof, it will be understood that it is capable of further modification, and this application is intended to cover any variations, uses or adaptations of the invention. It will, therefore, be recognized that the invention is not to be considered as limited to the precise embodiments shown and described but is to be interpreted as broadly as permitted by the appended claims.

We claim:
1. An abrasive article comprising abrasive grain and a polybenzimidazole resin bond uniting said grain into an integral body.
2. The abrasive article as defined in claim 1 wherein a particulate filler material is included in said article.
3. The abrasive article as defined in claim 1 wherein said polybenzimidazole resin bond comprises the condensation reaction product of 3,3' diaminobenzidine and diphenyl isophthalate.
4. The abrasive article as defined in claim 1 wherein said article comprises a grinding portion and a supporting portion, said grinding portion comprising diamond abrasive grain and a polybenzimidazole resin bond therefor, said bond being substantially free of voids and characterized by high strength and high thermal resistance.
5. An abrasive article as defined in claim 5 wherein said supporting portion comprises particulate silicon carbide bonded by a polybenzimidazole resin.
6. An abrasive article as defined in claim 5 wherein said grinding portion consists essentially of 25 volume percent diamond abrasive and 75 volume percent polybenzimidazole resin.
7. An abrasive article as defined in claim 6 wherein said grinding portion additionally contains 25 volume percent particulate inorganic filler material.
8. A process for forming polybenzimidazole resin bonded abrasive articles which comprise the steps of forming an advanced heat flowable polybenzimidazole resin having less than 10 weight percent of volatile material by heating materials selected from the group consisting of polybenzimidazole monomers and polybenzimidazole prepolymers to a temperature of not more than 300° C. in an inert atmosphere and molding said resin and abrasive grain at a pressure of at least 2000 p.s.i. at a temperature above the resin advancement temperature and not more than 550° C.
9. The process as defined in claim 8 wherein said advanced resin is formed in the presence of at least one member of the group consisting of particulate inorganic filler material and abrasive granules.
10. The process as defined in claim 8 wherein particulate inorganic filler material is molded with said advanced heat flowable resin and abrasive granules.

References Cited

UNITED STATES PATENTS

| Re. 26,065 | 7/1966 | Marvel et al. _____ 260—47 |
| 2,895,948 | 7/1959 | Brinker et al. _____ 260—78.4 |
| 3,174,947 | 3/1965 | Marvel et al. _____ 260—47 |
| 3,230,196 | 1/1966 | Moyer _____ 260—47 |

ALEXANDER H. BRODMERKEL, *Primary Examiner.*

D. J. ARNOLD, *Assistant Examiner.*

UNITED STATES PATENT OFFICE

CERTIFICATE OF CORRECTION

Patent No. 3,329,489                                         July 4, 1967

John H. Mason et al.

It is hereby certified that error appears in the above numbered patent requiring correction and that the said Letters Patent should read as corrected below.

Column 3, line 10, for "Exmaple" read -- Example --; column 4, TABLE II, footnote "2", last column, line 1 thereof, for "0.000" read -- 0.002 --; same column, line 2, for "0.062" read -- 0.060 --; column 6, line 32, for the claim reference numeral "5" read -- 4 --.

Signed and sealed this 17th day of December 1968.

(SEAL)
Attest:

Edward M. Fletcher, Jr.                              EDWARD J. BRENNER

Attesting Officer                                            Commissioner of Patents